US011575871B2

(12) United States Patent
Jeong et al.

(10) Patent No.: US 11,575,871 B2
(45) Date of Patent: Feb. 7, 2023

(54) METHOD AND APPARATUS FOR STREAMING MULTI-VIEW 360 DEGREE VIDEO

(71) Applicant: RESEARCH & BUSINESS FOUNDATION SUNGKYUNKWAN UNIVERSITY, Suwon-si (KR)

(72) Inventors: Jong Beom Jeong, Yangju-si (KR); Soon Bin Lee, Seongnam-si (KR); Eun Seok Ryu, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 17/500,439

(22) Filed: Oct. 13, 2021

(65) Prior Publication Data
US 2022/0116578 A1    Apr. 14, 2022

(30) Foreign Application Priority Data
Oct. 14, 2020  (KR) ........................ 10-2020-0133027

(51) Int. Cl.
*H04N 13/194* (2018.01)
*H04N 13/161* (2018.01)
(Continued)

(52) U.S. Cl.
CPC ......... *H04N 13/194* (2018.05); *H04N 13/161* (2018.05); *H04N 13/178* (2018.05);
(Continued)

(58) Field of Classification Search
CPC .. H04N 13/194; H04N 13/161; H04N 13/178; H04N 13/366; H04N 19/174; H04N 19/188; H04N 13/00; H04N 19/597
(Continued)

(56) References Cited

U.S. PATENT DOCUMENTS

| 10,873,737 | B1 * | 12/2020 | Kim ...................... H04N 19/33 |
| 2019/0166376 | A1 * | 5/2019 | Thomas ............... H04N 19/174 |

(Continued)

FOREIGN PATENT DOCUMENTS

| KR | 10-2018-0048443 A | 5/2018 |
| KR | 10-2020-0076529 A | 6/2020 |

OTHER PUBLICATIONS

Korean Office Action dated Sep. 19, 2021, in counterpart Korean Patent Application No. 10-2020-0133027 (5 pages in Korean).

*Primary Examiner* — Tung T Vo
(74) *Attorney, Agent, or Firm* — NSIP Law (57) ABSTRACT

Provided are a method and an apparatus for streaming a multi-view 360 degree video, and a method for streaming a 360 degree video according to an embodiment of the present disclosure includes: encoding a multi-view video to a bitstream of a base layer and a bitstream of a tile layer constituted by at least one tile; selecting a tile included in a user view video in the encoded bitstream of the tile layer by using user view information received from a 360 degree video rendering apparatus, and video information of the multi-view video; extracting tile data included in the selected user view video from the encoded bitstream of the tile layer, and generating a tile bitstream corresponding to the extracted tile data; and transmitting the encoded bitstream of the base layer and the generated tile bitstream to the 360 degree video rendering apparatus.

19 Claims, 8 Drawing Sheets

(51) Int. Cl.
　　　　*H04N 19/169*　　　(2014.01)
　　　　*H04N 19/174*　　　(2014.01)
　　　　*H04N 13/366*　　　(2018.01)
　　　　*H04N 13/178*　　　(2018.01)

(52) U.S. Cl.
　　　CPC ......... *H04N 13/366* (2018.05); *H04N 19/174*
　　　　　　　(2014.11); *H04N 19/188* (2014.11)

(58) Field of Classification Search
　　　USPC .......................................................... 348/36
　　　See application file for complete search history.

(56) References Cited

U.S. PATENT DOCUMENTS

| | | | |
|---|---|---|---|
| 2019/0238860 A1* | 8/2019 | Lim | H04N 21/4728 |
| 2020/0374535 A1* | 11/2020 | Makeev | H04N 19/182 |
| 2022/0256131 A1* | 8/2022 | Oh | H04N 13/161 |

\* cited by examiner

```
PW: Picture width
PH: Picture height
TW: Tile width
TH: Tile height
VW: Viewport width
VH: Viewport height
H: Heuristic interval coefficient
S: Source views
V: Viewport
p_s : Points of a source view
p_v : Points of a viewport
t_p : Tile index of a point p
L_t : List of viewport tiles in a source view for all S_i ∈ S do
   for row = 0 to row = PW/TW do
      for col = 0 to col = PH/TH do
         for j = 0, k = 0 to j= TW/H, k = TH/H do
            add S_i (row * TW + j * H, col * TH + k * H) to p_s
         end for
      end for
   end for
end for for row = 0 to row = VW/TW do
   for col = 0 to col = VH/TH do
      for i = 0, j = to i = TW/H, j=TH/H do
         add S_i (row * TW + i * H, col * TH + j * H) to p_v
      end for
   end for
end for
end for
```

```
PW: Picture width
PH: Picture height
TW: Tile width
TH: Tile height
VW: Viewport width
VH: Viewport height
H: Heuristic interval coefficient
S: Source views
V: Viewport
p_s : Points of a source view
p_v : Points of a viewport
t_p : Tile index of a point p
L_t : List of viewport tiles in a source view for all S_i ∈ S do
  R ← Rotation martix from S_i to V
  T ← Translation matrix from S_i to V
  for all p_j ∈ S_i do
    p'_j = R · p_j + T
      t_{p_j} = (p_j (y)/TH) · (PW/TW) + p_j (x)/TW
    if t_{p_j} is not in L_t then
      for all p_v do
        if p'_j = p_v then
          add t_{p_j} to L_t
        end if
      end for
    end if
  end for
end for
```

Fig. 8

METHOD AND APPARATUS FOR STREAMING MULTI-VIEW 360 DEGREE VIDEO

CROSS-REFERENCE TO RELATED APPLICATIONS

This application claims the benefit under 35 U.S.C. § 119(a) of Korean Patent Application No. 10-2020-0133027 filed on Oct. 14, 2020 in the Korean Intellectual Property Office, the entire disclosure of which is incorporated herein by reference for all purposes.

BACKGROUND OF THE DISCLOSURE

Field of the Disclosure

The present disclosure relates to a method and an apparatus for streaming a multi-view 360 degree video.

Related Art

In recent years, with the development of virtual reality technologies and equipment, devices that can experience virtual realities such as a head-mounted display (HMD) have been released. Since the head-mounted display (HMD) should reproduce an omnidirectional 360 degree video, an ultra high-definition video of an ultra high-definition (UHD) class or higher is required, and as a result, a high bandwidth is required for transmission of the corresponding video.

In order to complement this, proposed is a method that specifies an area watched by a user for a single video to a rectangular tile and transmits the specified tile with a high definition, and transmits remaining tiles with a low definition. An area actually shown to the user through the HMD is a part of the video at the time of transmitting the 360 degree video, and as a result, if view information of the user is known in advance, a whole video need not sent. Accordingly, proposed is a motion-constrained tile set (MCTS) capable of extracting only a partial area in the whole video as the rectangular tile, and a tile selection and extraction technique corresponding to a user view, which corresponds thereto is also proposed.

Meanwhile, in order to maximize a sensation of immersion at the time of providing actual image based contents in a virtual reality environment, a blind spot should be minimized when rendering a view of a user by simultaneously transmitting various videos, and in this case, there is a problem in that a bandwidth is wasted because a tile based streaming technique in related art cannot be applied.

Therefore, a user view time selection technique for a plurality of videos is required which is improved further from a user view time tile selection technique. A different access from the related art is required to use a tile based streaming technique when transmitting a multi-view video in order to provide immersive media.

SUMMARY OF THE DISCLOSURE

Embodiments of the present disclosure provide a method and a device for streaming a 360 degree video, which are used for selecting and extracting tiles corresponding to a user view in a multi-view 360 degree video, and transmitting the extracted tiles as a bitstream.

However, it is to be understood that the technical problem to be solved by the present disclosure is not limited to the above problems and may be variously extended in an environment of a range which does not depart from the spirit and area of the present disclosure.

In an aspect, a method for streaming a 360 degree video, which is performed by a 360 degree video streaming apparatus, including: encoding a multi-view video to a bitstream of a base layer and a bitstream of a tile layer constituted by at least one tile; selecting a tile included in a user view video in the encoded bitstream of the tile layer by using user view information received from a 360 degree video rendering apparatus, and video information of the multi-view video; extracting tile data included in the selected user view video from the encoded bitstream of the tile layer, and generating a tile bitstream corresponding to the extracted tile data; and transmitting the encoded bitstream of the base layer and the generated tile bitstream to the 360 degree video rendering apparatus may be provided.

The user view information may include rotation and position values of a head-mounted display worn by a user.

The video information of the multi-view video may include a depth map of the multi-view video and a camera parameter of each video.

In the selecting, some pixels corresponding to each other are selected in the multi-view video and the user view video, respectively to calculate whether a user view tile is included.

A coordinate of a pixel to be used for calculating whether the user view tile is included may be determined as a multiple of a Heuristic interval coefficient.

In the selecting, a pixel warped to the user view video from the multi-view video may be calculated by using a rotation matrix representing a rotation to the user view video from the multi-view video and a translation matrix representing a distance.

In the selecting, a tile index of a pixel coordinate in the multi-view video corresponding to the calculated warped pixel may be calculated by using a width and a height of the multi-view video and a width and a height of the tile.

In the selecting, when the calculated warped pixel is included in a point set of the user view video, the tile index of the pixel coordinate in the multi-view video corresponding to the calculated warped pixel may be added to an index set of the user view tile.

In the generating, tile data corresponding to the added index set of the user view tile may be extracted from the encoded bitstream of the tile layer.

In the generating, the tile data included in the selected user view video may be analyzed in units of network abstraction layer (NAL) from the bitstream of the encoded tile layer, and a tile is included in the user view video is extracted to generate the tile bitstream.

In another aspect, an apparatus for streaming a multi-view 360 degree video, including: a video encoder encoding a multi-view video to a bitstream of a base layer and a bitstream of a tile layer constituted by at least one tile; a user view tile selector selecting a tile included in a user view video in the encoded bitstream of the tile layer by using user view information received from a 360 degree video rendering apparatus, and video information of the multi-view video; a tile extractor extracting tile data included in the selected user view video from the encoded bitstream of the tile layer, and generating a tile bitstream corresponding to the extracted tile data; and a transmitter transmitting the encoded bitstream of the base layer and the generated tile bitstream to the 360 degree video rendering apparatus may be provided.

The user view information may include rotation and position values of a head-mounted display worn by a user.

The video information of the multi-view video may include a depth map of the multi-view video and a camera parameter of each video.

The user view tile selector selects some pixels corresponding to each other in the multi-view video and the user view video, respectively to calculate whether a user view tile is included.

A coordinate of a pixel to be used for calculating whether the user view tile is included may be determined as a multiple of a Heuristic interval coefficient.

The user view tile selector may calculate a pixel warped to the user view video from the multi-view video by using a rotation matrix representing a rotation to the user view video from the multi-view video and a translation matrix representing a distance.

The user view tile selector may calculate a tile index of a pixel coordinate in the multi-view video corresponding to the calculated warped pixel by using a width and a height of the multi-view video and a width and a height of the tile.

The user view tile selector may add, when the calculated warped pixel is included in a point set of the user view video, the tile index of the pixel coordinate in the multi-view video corresponding to the calculated warped pixel to an index set of the user view tile.

The tile extractor may extract tile data corresponding to the added index set of the user view tile from the encoded bitstream of the tile layer.

The tile extractor may analyze the tile data included in the selected user view video in units of network abstraction layer (NAL) from the bitstream of the encoded tile layer, and extract a tile is included in the user view video to generate the tile bitstream.

Meanwhile, in yet another aspect, a non-transitory computer readable storage medium for storing instructions, may be provided, in which when the instructions are executed by a processor, the instructions allow the processor to execute a method, and the method includes: encoding a multi-view video to a bitstream of a base layer and a bitstream of a tile layer constituted by at least one tile; selecting a tile included in a user view video in the encoded bitstream of the tile layer by using user view information received from a 360 degree video rendering apparatus, and video information of the multi-view video; extracting tile data included in the selected user view video from the encoded bitstream of the tile layer, and generating a tile bitstream corresponding to the extracted tile data; and transmitting the encoded bitstream of the base layer and the generated tile bitstream to the 360 degree video rendering apparatus, and in the selecting, a pixel warped to the user view video from the multi-view video is calculated by using a rotation matrix representing a rotation to the user view video from the multi-view video and a translation matrix representing a distance.

The disclosed technology may have the following effects. However, since it is not meant that a particular embodiment should include all of the following effects or merely include the following effects, the scope of the disclosed technology is not to be construed as being limited thereby.

According to embodiments of the present disclosure, a transmission bandwidth can be saved and a user delay time can be reduced as compared with a case where all multi-view 360 degree videos are transmitted without considering a user view.

Further, according to embodiments of the present disclosure, since a user view video is decoded, which has a smaller size than all multi-view 360 degree videos, a computation amount required for a head-mounted display can be reduced.

Further, according to embodiments of the present disclosure, there is an effect that a high-quality video can be adaptively transmitted according to a state of a communication line for video transmission.

DESCRIPTION OF EXEMPLARY EMBODIMENTS

A technology disclosed in the present disclosure may be applied to a user view based multi-view 360 degree video transmission technology. However, the technology disclosed in the present disclosure is not limited thereto, but may be applied even to all electronic devices and methods applicable to a technical spirit of the technology.

The present disclosure may have various modifications and various embodiments and specific embodiments will be illustrated in the drawings and described in detail in the detailed description. However, this does not limit the present disclosure within specific embodiments, and it should be understood that the present disclosure covers all the modifications, equivalents and replacements within the idea and technical scope of the present disclosure. In describing the present disclosure, a detailed description of related known technologies will be omitted if it is determined that they make the gist of the present disclosure unclear.

Terms including as first, second, and the like are used for describing various components, but the components are not limited by the terms. The terms are used only to discriminate one component from another component.

Terms used in the present disclosure are used only to describe specific embodiments, and are not intended to limit the present disclosure. Terms used in the present disclosure adopt general terms which are currently widely used as possible by considering functions in the present disclosure, but the terms may be changed depending on an intention of those skilled in the art, a precedent, emergence of new technology, etc. Further, in a specific case, a term which an applicant arbitrarily selects is present and in this case, a meaning of the term will be disclosed in detail in a corresponding description part of the disclosure. Accordingly, a term used in the present disclosure should be defined based on not just a name of the term but a meaning of the term and contents throughout the present disclosure.

A singular form includes a plural form if there is no clearly opposite meaning in the context. In the present disclosure, it should be understood that the term "include" or "have" indicates that a feature, a number, a step, an operation, a component, a part or the combination thereof described in the present disclosure is present, but does not exclude a possibility of presence or addition of one or more other features, numbers, steps, operations, components, parts or combinations thereof, in advance.

Hereinafter, the embodiments of the present disclosure will be described in detail with reference to the accompanying drawings, in which like reference numerals refer to like or corresponding elements and a duplicated description thereof will be omitted when the embodiments are described with reference to the drawings.

Figure 1:
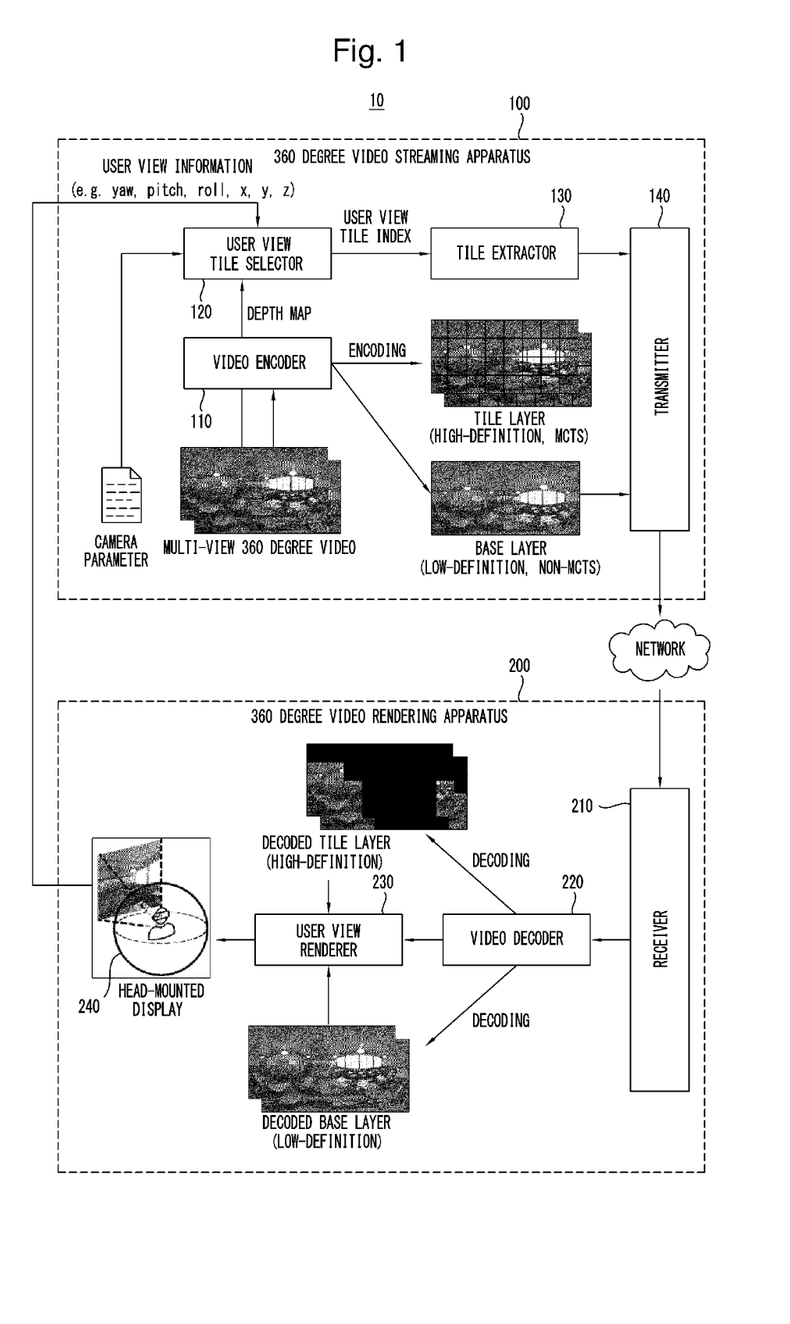
FIG. 1 is a configuration diagram illustrating a configuration of a virtual reality system according to an embodiment of the present disclosure.

FIG. 1 is a configuration diagram illustrating a configuration of a virtual reality system according to an embodiment of the present disclosure. In FIG. 1, an exemplary method of a transmission method is illustrated, which includes high-definition tile extraction corresponding to a user view video and a low-definition for a full video in a virtual reality system 10 for streaming a 360 degree video of multi-view 360 degrees.

As illustrated in FIG. 1, the virtual reality system 10 according to an embodiment of the present disclosure includes a 360 degree video streaming apparatus 100 and a 360 degree video rendering apparatus 200. The virtual reality system 10 may be called a multi-view 360 degree video tile based streaming and reproduction system. The 360 degree video streaming apparatus 100 may be referred to as a 360 degree video streaming server. The 360 degree video rendering apparatus 200 may be referred to as a 360 degree video rendering client.

Here, the 360 degree video streaming apparatus 100 includes a video encoder 110, a user view tile selector 120, a tile extractor 130, and a transmitter 140. Further, the 360 degree video rendering apparatus 200 includes a receiver 210, a video decoder 220, a user view renderer 230, and a head-mounted display 240. However, all illustrated components are not required components. The virtual reality system 10 may be implemented by components more than the illustrated components and the virtual reality system 10 may be implemented by smaller components therethan. The number of respective components illustrated in FIG. 1 is just exemplary, but is not limited thereto.

Hereinafter, a detailed configuration and a detailed operation of each of the components of the virtual reality system 10 according to an embodiment of the present disclosure in FIG. 1 will be described.

First, the 360 degree video streaming apparatus 100 according to an embodiment of the present disclosure performs a method for selecting, extracting, and transmitting a tile corresponding to a user view in a multi-view 360 degree video. The 360 degree video streaming apparatus 100 specifies rectangular tiles included in the user view in each video by using depth maps and camera parameters of a plurality of 360 degree videos, and extracts the corresponding tiles in a form of a compressed bitstream, in order to select the tile corresponding to the user view. That is, the 360 degree video streaming apparatus 100 may encode at least one multi-view 360 degree video to a video with a desired quality, selects and extracts a tile included in the user view in each video, and transmit the extracted tile to the 360 degree video rendering apparatus 200.

The video encoder 110 encodes a multi-view video to a bitstream of a base layer and a bitstream of a tile layer constituted by at least one tile. The video encoder 110 performs an operation of dividing an entire area of multiple 360 degree videos into the rectangular tiles. The video encoder 110 encodes at least one multi-view 360 degree video to a video with a desired quality, but divides and encodes the corresponding video into the bitstream of the tile layer and the bitstream of the base layer. The video encoder 110 encodes a high-definition video by applying a motion-constrained tile set (MCTS) in the tile layer to independently extract the tile. Through this, only the tile corresponding to the user view may be extracted and transmitted. To this end, the tile and a slice may correspond to each other 1 to 1, and partial decoding may be applied for extraction of a parameter set. The video encoder 110 encodes the video to a low definition without applying the motion-constrained tile technique in the base layer. Through this, all areas other than an area expressed by the high-definition tile layer after transmission may be expressed.

The user view tile selector 120 selects a tile included in the user view from the bitstream of the encoded tile layer by using user view information and video information of a multi-view video received from the 360 degree rendering apparatus 200. Here, the user view information may include rotation and position values of the head-mounted display 240 worn by a user. The video information of the multi-view video may include a depth map of the multi-view video and a camera parameter of each video. The user view tile selector 120 performs an operation of selecting a tile corresponding to a view seen by the user in a virtual reality space. The user view tile selector 120 receives the rotation and position values of the head-mounted display 240 worn by the user, the depth map of the multi-view 360 degree videos, and the camera parameter of each video to specify tiles corresponding to a view which the user looks at in each 360 degree video. Subsequently, the user view tile selector 120 delivers, to the tile extractor 130, user view tile index information corresponding to specified tiles.

According to embodiments, the user view tile selector 120 selects each of some pixels corresponding to each other in the multi-view video and the user view video to calculate whether a user view tile is included. Here, the user view tile selector 120 may determine a coordinate of the pixel to be used for calculating whether the user view tile is included as a multiple of a Heuristic interval coefficient.

According to embodiments, the user view tile selector 120 may calculate a pixel warped to the user view video from the multi-view video by using a rotation matrix representing a rotation to the user view video from the multi-view video and a translation matrix representing a distance. Here, the user view tile selector 120 may calculate a tile index of a pixel coordinate in the multi-view video corresponding to the calculated warped pixel by using a width and a height of the multi-view video and a width and a height of the tile. When the calculated warped pixel is included in a point set of the user view video, the user view tile selector 120 may add the tile index of the pixel coordinate in the multi-view video corresponding to the calculated warped pixel to an index set of the user view tile.

The tile extractor 130 extracts tile data included in the selected user view from the bitstream of the tile layer encoded by the video encoder 110, and generates a tile bitstream corresponding to the extracted tile data. The tile extractor 130 performs an operation of searching and extracting at least one tile of the selected tiles from a bitstream for a full video. The tile extractor 130 analyzes the tile data included in the user view from the bitstream of the encoded tile layer in the multi-view 360 degree video, and extracts a target tile included in the user view to generate the tile bitstream.

According to embodiments, the tile extractor 130 may extract the tile data corresponding to the index set of the added user view tile from the bitstream of the encoded tile layer.

The transmitter 140 transmits, to the video rendering apparatus 200, the bitstream of the base layer encoded by the video encoder 110 and the tile bitstream generated by the tile extractor 130. The transmitter 140 performs an operation of transmitting a plurality of tiles extracted by the tile extractor 130.

Meanwhile, in the virtual reality system 10, the 360 degree video rendering apparatus 200 may decode the bitstream received from the 360 degree video streaming apparatus 100, and then generate a video corresponding to the user view, and output the generated video through the head-mounted display 240. The 360 degree video rendering apparatus 200 may be referred to as a 360 degree video rendering client.

The receiver 210 receives, from the 360 degree video streaming apparatus 100, the bitstream of the base layer, metadata, and the tile bitstream.

The video decoder 220 decodes the tile bitstream and the base layer bitstream transmitted from the receiver 210 to generate a high-definition video and a low-definition video, respectively.

The user view renderer 230 generates the video of the view which the user looks at by using the multi-view 360 degree video decoded by the video decoder 220.

The head-mounted display 240 displays the user view video generated by the user view renderer 230 on a screen to allow the user to view the video.

Figure 2:
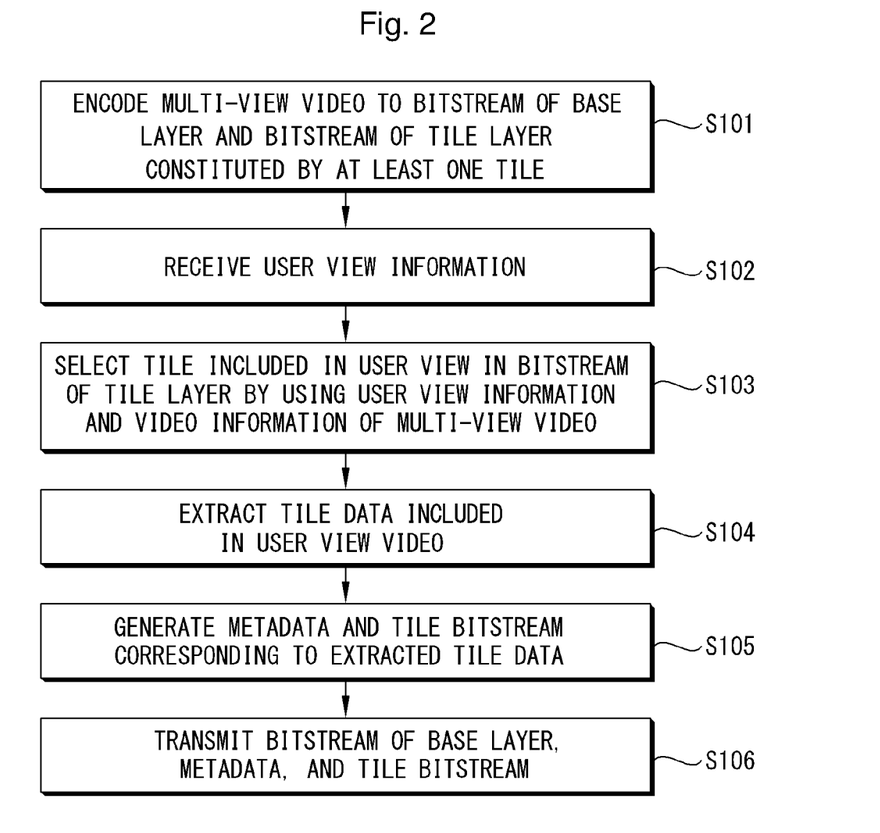
FIG. 2 is a flowchart illustrating a method for streaming a multi-view 360 degree video according to an embodiment of the present disclosure.

FIG. 2 is a flowchart illustrating a method for streaming a multi-view 360 degree video according to an embodiment of the present disclosure. In FIG. 2, an exemplary flowchart of tile extraction and bitstream transmission corresponding to the user view in the multi-view 360 degree video is illustrated.

In step S101, the 360 degree video streaming apparatus 100 encodes a multi-view video to a bitstream of a base layer and a bitstream of a tile layer constituted by at least one tile. The 360 degree video streaming apparatus 100 may divide a vide expressing a virtual reality space into one or more rectangular tiles.

In step S102, the 360 degree video streaming apparatus 100 receives user view information from the 360 degree video rendering apparatus 200. The 360 degree video streaming apparatus 100 may receive, from the 360 degree video rendering apparatus 200, user view metadata (e.g., yaw, pitch, roll, x, y, z) corresponding to a user view. Alternatively, the 360 degree video streaming apparatus 100 may receive indices of tiles corresponding to the user view.

In step S103, the 360 degree video streaming apparatus 100 selects a tile included in the user view from the bitstream of the encoded tile layer by using user view information and video information of a multi-view video received from the 360 degree rendering apparatus 200. The 360 degree video streaming apparatus 100 may calculate and specify the tile included in the user view in each video by using a depth map and a camera parameter of a multi-view 360 degree video.

In step S104, the 360 degree video streaming apparatus 100 extracts tile data included in the selected user view from the bitstream of the encoded tile layer. The 360 degree video streaming apparatus 100 may extract the tile data by accessing video data regarding the tiles included in the user view from the encoded bitstream by using a motion-constrained tile set (MCTS).

In step S105, the 360 degree video streaming apparatus 100 generates a tile bitstream corresponding to the extracted tile data. The 360 degree video streaming apparatus 100 may generate metadata and bitstreams corresponding to the extracted tile data.

In step S106, the 360 degree video streaming apparatus 100 transmits, to the 360 degree video rendering apparatus 200, the encoded bitstream of the base layer and the generated tile bitstream. The 360 degree video streaming apparatus 100 may transmit the generated tile bitstreams to the 360 degree video rendering apparatus 200.

Figure 3:
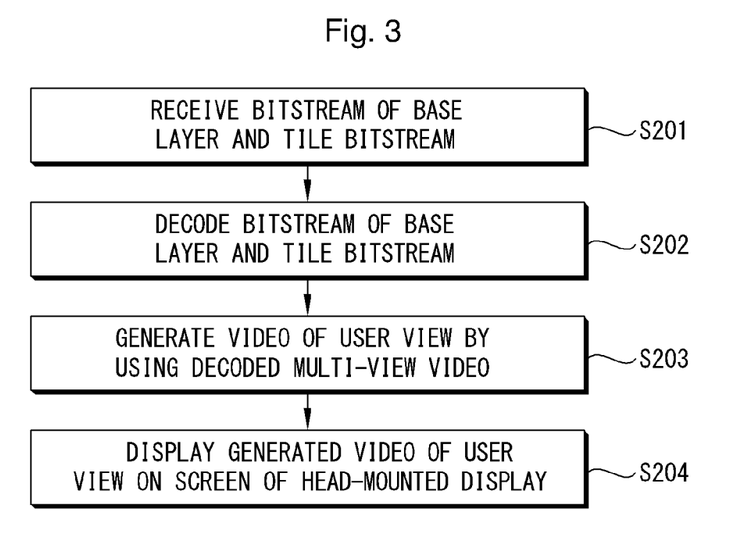
FIG. 3 is a flowchart illustrating a method for rendering a multi-view 360 degree video applied to an embodiment of the present disclosure.

FIG. 3 is a flowchart illustrating a method for rendering a multi-view 360 degree video applied to an embodiment of the present disclosure.

In step S201, the 360 degree video rendering apparatus 200 receives, from the 360 degree video streaming apparatus 100, a bitstream of a base layer, metadata, and a tile bitstream.

In step S202, the 360 degree video rendering apparatus 200 decodes the received tile bitstream and base layer bitstream to generate a high-definition video and a low-definition video, respectively.

In step S203, the 360 degree video rendering apparatus 200 generates the video of the view which the user looks at by using the decoded multi-view 360 degree video.

In step S204, the 360 degree video rendering apparatus 200 displays the user view video generated by the user view renderer 230 on a screen of the head-mounted display 240 to allow the user to view the video.

Figure 4:
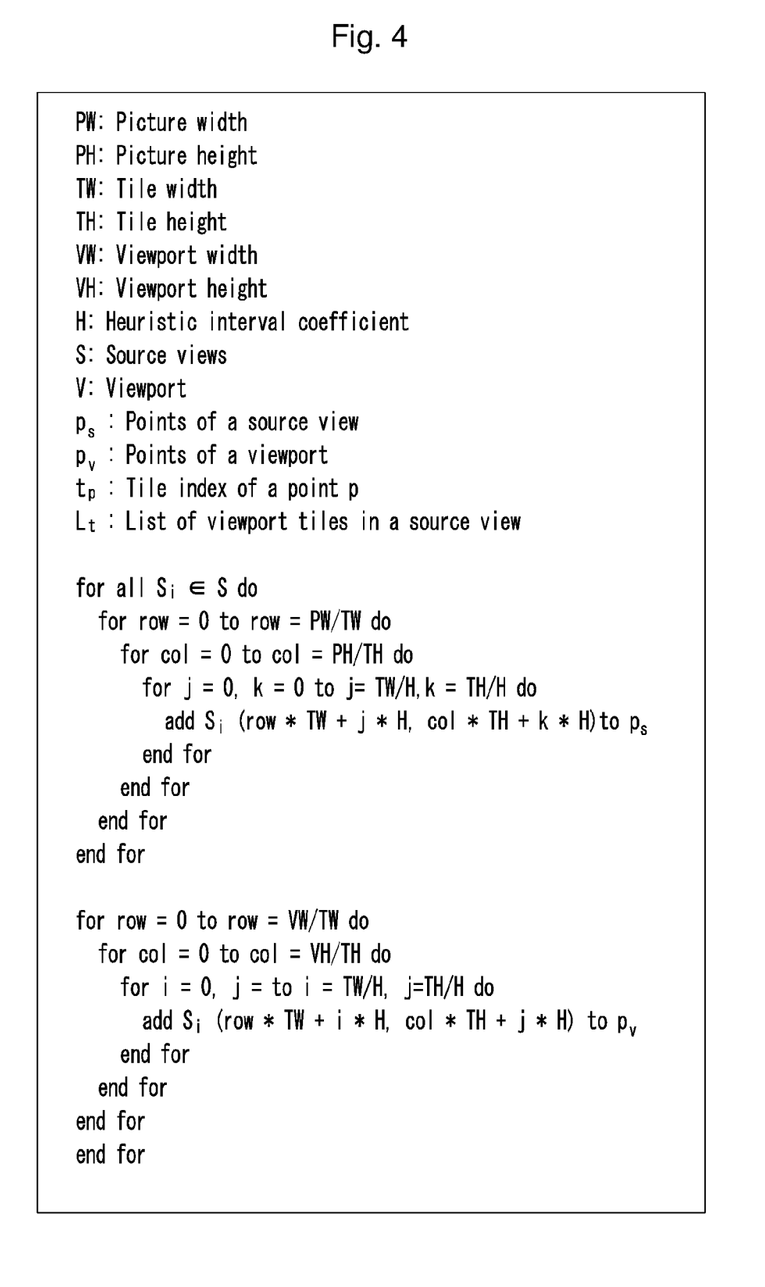
FIGS. 4 to 6 are diagrams and flowcharts illustrating a heuristic pixel selection algorithm used in the method for streaming a multi-view 360 degree video according to an embodiment of the present disclosure.
Figure 5:
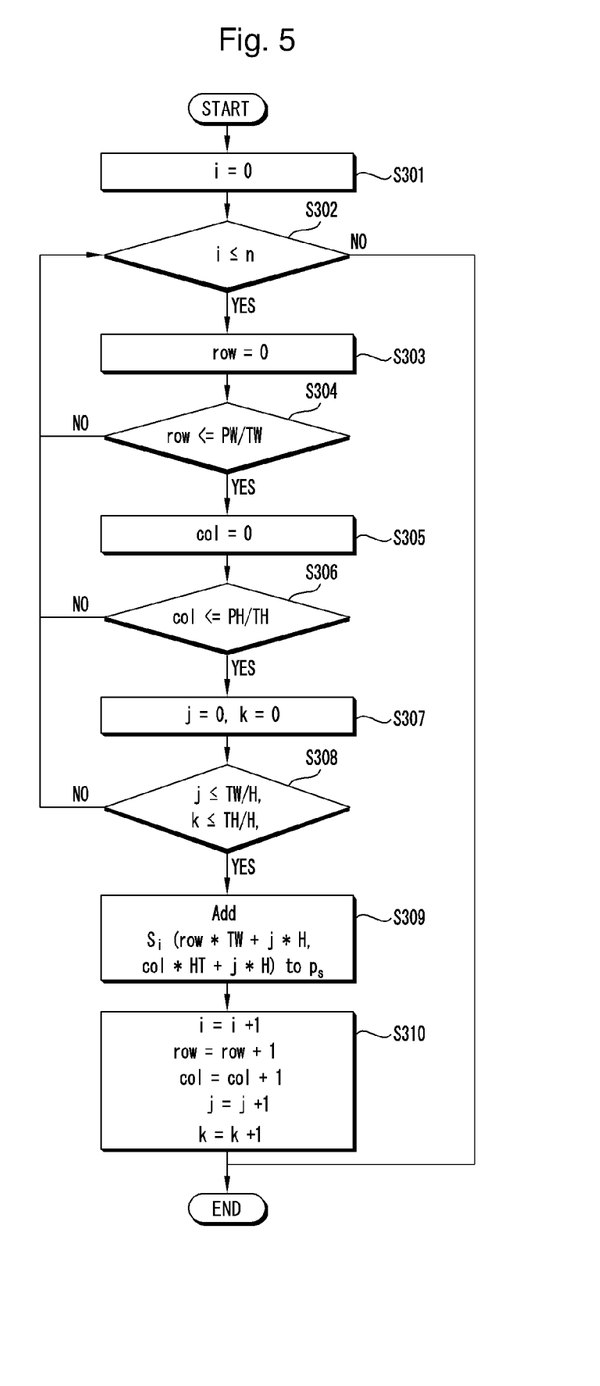
Figure 6:
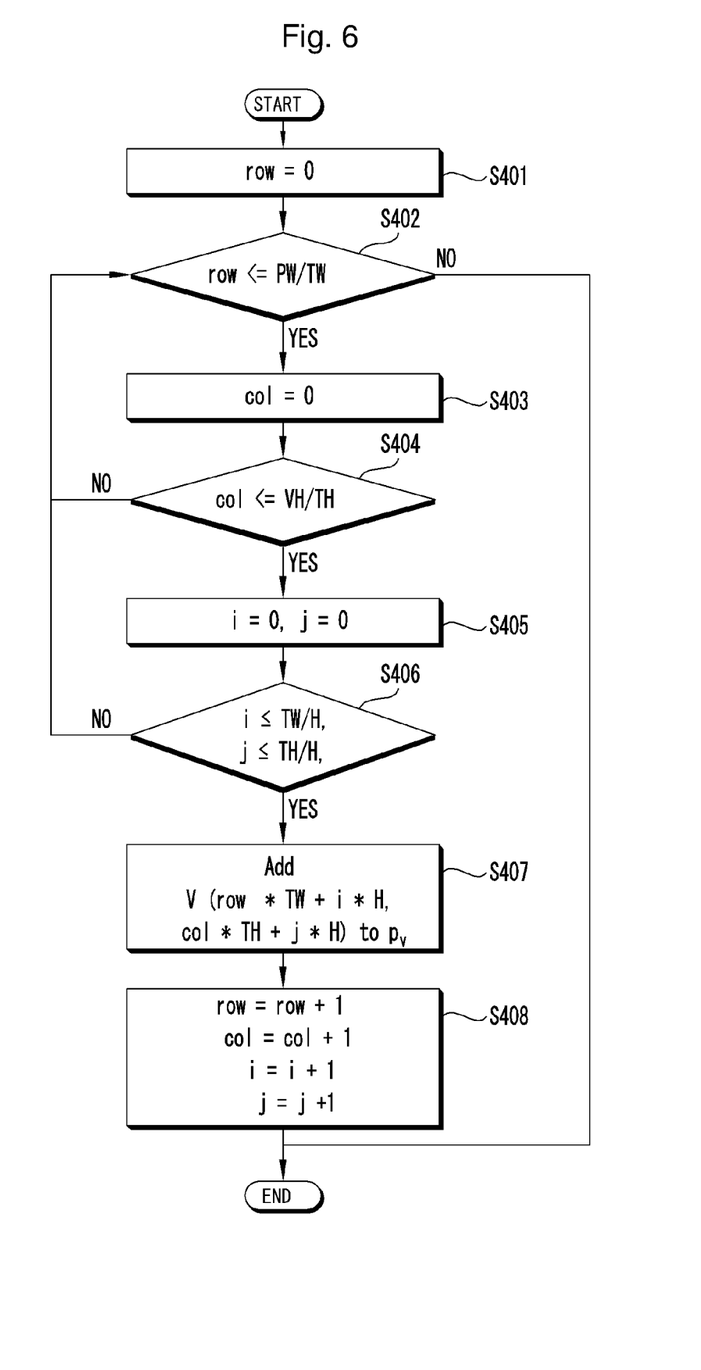

FIGS. 4 to 6 are diagrams and flowcharts illustrating a heuristic pixel selection algorithm used in the method for streaming a multi-view 360 degree video according to an embodiment of the present disclosure.

In FIG. 4, a table illustrating a Heuristic pixel selection algorithm to be used for tile selection in a multi-view 360 degree video and a user view is illustrated. The 360 degree video streaming apparatus 100 selects some pixels in the multi-view 360 degree video and the user view video. In this case, whether the user view tile is included is calculated to save a required computation amount and time. A coordinate of the pixel to be used for the calculation may be determined as a multiple of H which is a Heuristic interval coefficient.

Referring to FIGS. 5 and 6, the Heuristic pixel selection algorithm that selects some pixels in the multi-view 360 degree video and the user view video will be described.

First, parameters used in each step are described as follows. n represents the number of source views, PW represents a picture width, PH represents a picture height, TW represents a tile width, TH represents a tile height, VW represents a viewport width, VH represents a viewport height, H represents a Heuristic interval coefficient, S represents a multi-view picture (source views), V represents a viewport, $T_i$ represents a target tile index, $S_i(x,y)$ represents an x-row and y-column point of an i-th picture, $p_s$ represents points of a source view, $p_v$ represents points of a viewport, $V(x,y)$ represents an x-row and y-column point of the viewport, $t_p$ represents a tile index of a point p, and $L_t$ represents an index set of viewport tiles in source views (list of viewport tiles in source views).

In step S301, the 360 degree video streaming apparatus 100 initializes a source view like i=0.

In step S302, the 360 degree video streaming apparatus 100 checks whether i is equal to or less than the number of source views, n. This is to repeat at the number of times which is as large as the number (n) of source views. When i is more than the number (n) of source views, the 360 degree video streaming apparatus 100 terminates step S302 by confirming that this step is performed for all source views.

In step S303, when i is equal to or less than the number of source views, n, the 360 degree video streaming apparatus 100 initializes a row like row=0.

In step S304, the 360 degree video streaming apparatus 100 checks whether the row is equal to or less than PW/TW. When the row is more than PW/TW, the 360 degree video streaming apparatus 100 first performs step S302.

In step S305, when the row is equal to or less than PW/TW, the 360 degree video streaming apparatus 100 initializes a column (col) like col=0.

In step S306, the 360 degree video streaming apparatus 100 checks whether the col is equal to or less than PH/TH. When the col is more than PH/TH, the 360 degree video streaming apparatus 100 first performs step S302.

In step S307, when the col is equal to or less than PH/TH, the 360 degree video streaming apparatus 100 initializes a Heuristic interval coefficient like j=0, k=0.

In step S308, the 360 degree video streaming apparatus 100 checks whether j is equal to or less than TW/H and k is equal to or less than TH/H. This is to select the pixel within the Heuristic interval coefficient (H). When j is more than TW/H and k is more than TH/H, the 360 degree video streaming apparatus 100 first performs step S302.

In step S309, when j is equal to or less than TW/H and k is equal to or less than TH/H, the 360 degree video streaming apparatus 100 adds row*TW+j*H row and col*TH+k*H column points of the i-th source view $S_i$, i.e., $S_i$ (row*TW+ j*H, col*TH+k*H) to points of the source view, $p_s$.

In step S310, the 360 degree video streaming apparatus 100 first repeatedly performs step S302 by changing each parameter to a subsequent parameter like i=i+1, row=row+1, col=col+1, j=j+1, and k=k+1.

Meanwhile, as illustrated in FIG. 5, in step S401, the 360 degree video streaming apparatus 100 initializes the row like row=0.

In step S402, the 360 degree video streaming apparatus 100 checks whether the row is equal to or less than VW/TW. When the row is more than VW/TW, the 360 degree video streaming apparatus 100 terminates step S402.

In step S403, when the row is equal to or less than VW/TW, the 360 degree video streaming apparatus 100 initializes the column (col) like col=0.

In step S404, the 360 degree video streaming apparatus 100 checks whether the col is equal to or less than VH/TH. When the col is more than VH/TH, the 360 degree video streaming apparatus 100 first performs step S402.

In step S405, when the col is equal to or less than VH/TH, the 360 degree video streaming apparatus 100 initializes the Heuristic interval coefficient like i=0, j=0.

In step S406, the 360 degree video streaming apparatus 100 checks whether i is equal to or less than TW/H and j is equal to or less than TH/H. This is to select the pixel within the Heuristic interval coefficient (H). When i is more than TW/H and j is more than TH/H, the 360 degree video streaming apparatus 100 first performs step S402.

In step S407, when i is equal to or less than TW/H and k is equal to or less than TH/H, the 360 degree video streaming apparatus 100 adds row*TW+i*H row and col*TH+j*H column points of the viewport, i.e., V (row*TW+i*H, col*TH+j*H) to points of the viewport, $p_v$.

In step S410, the 360 degree video streaming apparatus 100 first repeatedly performs step S402 by changing each parameter to a subsequent parameter like row=row+1, col=col+1, i=i+1, and j=j+1.

Figure 7:
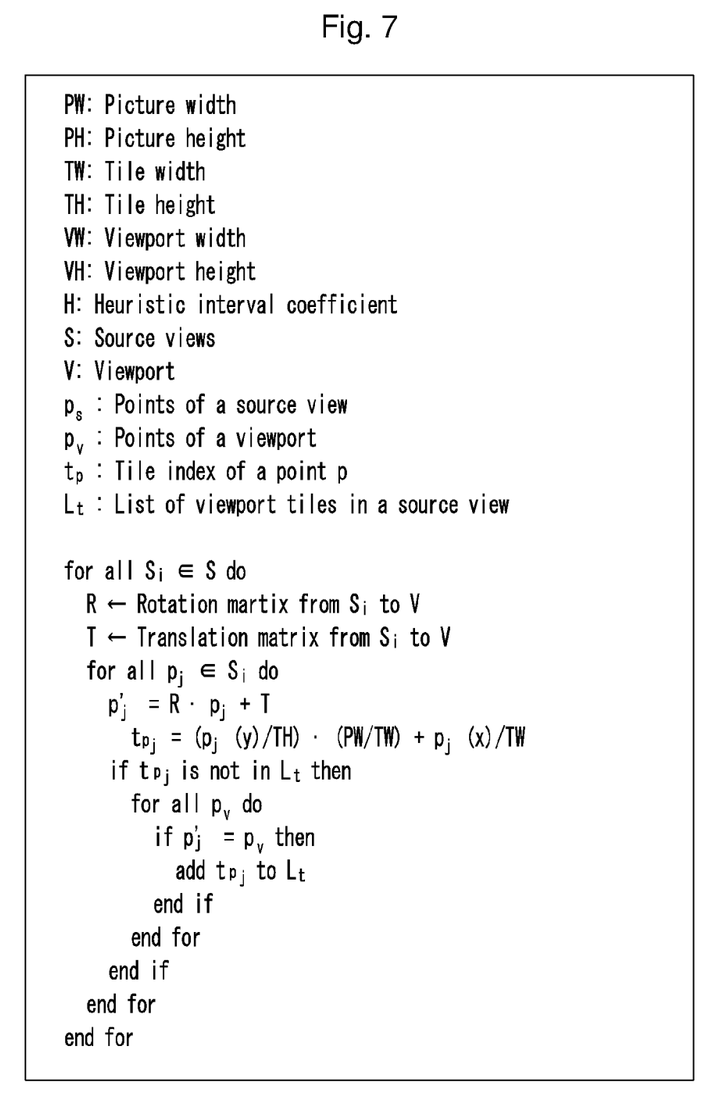
FIGS. 7 and 8 are diagrams and flowcharts illustrating a tile selection algorithm used in the method for streaming a multi-view 360 degree video according to an embodiment of the present disclosure.
Figure 8:
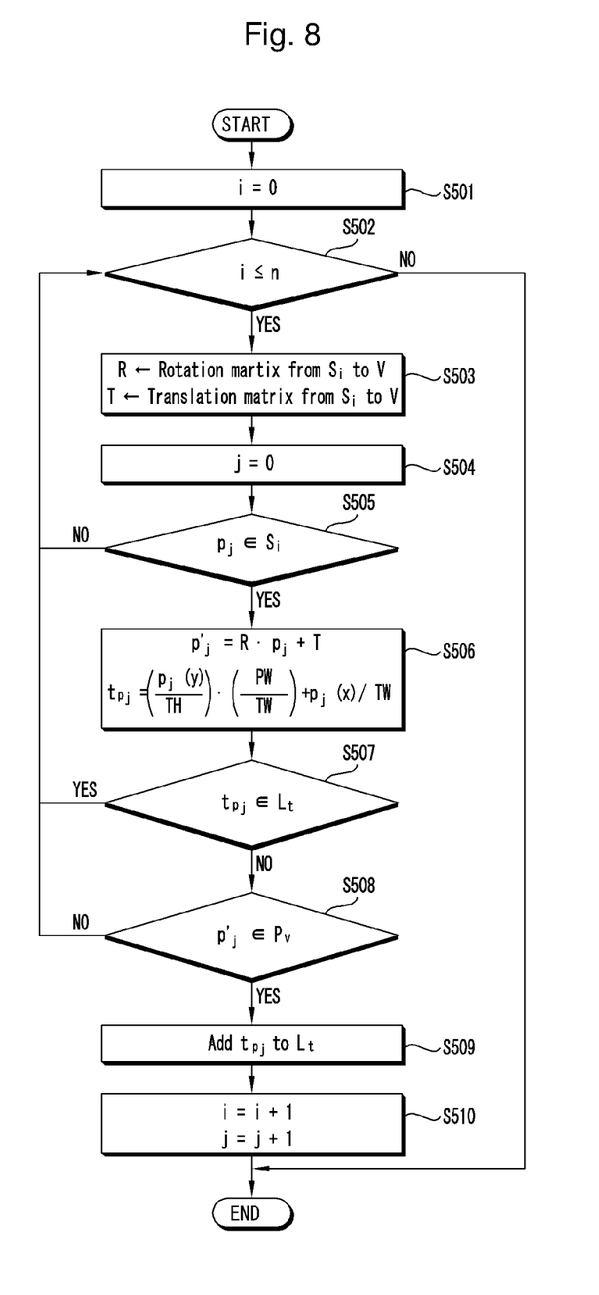

FIGS. 7 and 8 are diagrams and flowcharts illustrating a tile selection algorithm used in the method for streaming a multi-view 360 degree video according to an embodiment of the present disclosure.

In FIG. 7, a table illustrating an algorithm for tile selection corresponding to a user view in a multi-view 360 degree video is illustrated. A point $p_j$ which is a depth map pixel of each multi-view 360 degree video may be warped to a user view from a 360 degree. In this case, a rotation matrix R representing a rotation from the 360 degree video to the user view and a translation matrix T representing a distance may be used. A warped pixel $p'_j$ may be calculated by a sum of a multiplication of a point $p_j$ and R, and T, and represented at the viewport, and calculated through [Equation 1] below.

$$p'_j = R \cdot p_j + T \qquad \text{[Equation 1]}$$

Meanwhile, a tile index $t_{p_j}$ to which the pixel $p_j$ in the multi-view 360 degree video belongs may be calculated through [Equation 2] below. PW, TW, and TH represent a width of the 360 degree picture, the width of the tile, and a height of the tile.

$$t_{p_j} = \left(\frac{p_j(y)}{TH}\right) \cdot \left(\frac{PW}{TW}\right) + p_j(x)/TW \qquad \text{[Equation 2]}$$

If user view time indices are stored in $L_t$ and the tile index $t_{p_j}$ is included in $L_t$, subsequent $p_j$ is calculated. If the tile index $t_{p_j}$ is not included in $L_t$, the 360 degree video streaming apparatus 100 performs a comparison in value between a warped pixel $p'_j$ and $p_v$, which are all selected pixels of the user view by FIG. 4. If the compared values are equal to each other, the 360 degree video streaming apparatus 100 adds the tile index $t_{p_j}$ to $L_t$.

The 360 degree video streaming apparatus 100 may select user view tiles in each multi-view 360 degree video by using the tile selection algorithm illustrated in FIG. 7. Thereafter, the 360 degree video streaming apparatus 100 may extract, and then transmit the corresponding tiles as illustrated in FIG. 2.

Meanwhile, the 360 degree video streaming apparatus 100 performs each step after performing FIGS. 4 and 5 for the tile selection algorithm illustrated in FIG. 8.

In step S501, the 360 degree video streaming apparatus 100 initializes a source view like i=0.

In step S502, the 360 degree video streaming apparatus 100 checks whether i is equal to or less than the number of source views, n. This is to repeat at the number of times which is as large as the number (n) of source views. When i is more than the number (n) of source views, the 360 degree video streaming apparatus 100 terminates step S302 by confirming that this step is performed for all source views.

In step S503, when i is equal to or less than the number of source views, n, the 360 degree video streaming apparatus 100 designates a rotation matrix representing a rotation to the viewport V from the multi-view 360 degree video $S_i$ as R, and a translation matrix representing a distance as T. The rotation matrix R and the translation matrix T are used when moving from the source view to the viewport.

In steps S504 and S505, the 360 degree video streaming apparatus 100 designates j as 0, and checks whether the point $p_j$ belongs to the source view $S_j$. When the point $p_j$ does not belong to the source view, the 360 degree video streaming apparatus 100 first performs step S502.

In step S506, when the point $p_j$ belongs to the source view $S_i$, the 360 degree video streaming apparatus 100 calculates the warped pixel $p'_j$ by using the rotation matrix R and the translation matrix T as in [Equation 1] above, and calculates the tile index $t_{p_j}$ which the pixel $p_j$ in the multi-view 360 degree video belongs by using the source view width PW, the tile width TW, and the tile height TH. This represents movement from the source view to the viewport.

In step S507, the 360 degree video streaming apparatus 100 checks whether the calculated tile index $t_{p_j}$ is included in the index set $L_t$ of the user view tile. When the calculated tile index $t_{p_j}$ is included in the index set $L_t$ of the user view tile, the 360 degree video streaming apparatus 100 first performs step S502.

In step S508, when the calculated tile index $t_{p_j}$ is not included in the index set $L_t$ of the user view tile, the 360 degree video streaming apparatus 100 checks whether the warped pixel $p'_j$ is included in the points $p_v$ of the viewport. When the calculated tile index $t_{p_j}$ is not included in the index set $L_t$ of the user view tile, the 360 degree video streaming apparatus 100 first performs step S505.

In step S509, when warped pixel $p'_j$ is included in the points of the viewport, the 360 degree video streaming apparatus 100 adds the calculated tile index $t_{p_j}$ to index set $L_t$ of the user view tile.

In step S510, the 360 degree video streaming apparatus 100 first repeatedly performs step S502 by changing each parameter to a subsequent parameter like i=i+1, j=j+1.

Meanwhile, the method and the apparatus for streaming a multi-view 360 degree video according to an embodiment of the present disclosure may be utilized for adaptive multi-view 360 degree video streaming. The 360 degree video streaming apparatus 100 is used in parallel with a saliency map that predicts a user view for a video to more rapidly extract and transmit the target tile. Through this, super low delay streaming implementation is possible. When multiple tile bitstreams are transmitted, an embodiment of the present disclosure may be interlocked with MPEG DASH.

The multi-view 360 degree video streaming method according to an embodiment of the present disclosure may be applied to advanced video coding (AVC) and high-efficiency video coding (HEVC) widely used in the related art, versatile video coding (VVC) which is a next-generation video compression codec, and a test model for immersive video (TMIV) which is an immersive video compression codec proposed in moving picture experts group-immersive (MPEG-I).

Further, the multi-view 360 degree video streaming method according to an embodiment of the present disclosure is applicable even to MPEG DASH which is a streaming service of dividing and transmitting the bitstream, Smooth Streaming by Microsoft, and HTTP Live Streaming by Apple.

Meanwhile, a non-transitory computer readable storage medium for storing instructions, may be provided, in which when the instructions are executed by a processor, the instructions allow the processor to execute a method, and the method includes: encoding a multi-view video to a bitstream of a base layer and a bitstream of a tile layer constituted by at least one tile; selecting a tile included in a user view video in the encoded bitstream of the tile layer by using user view information received from a 360 degree video rendering apparatus, and video information of the multi-view video; extracting tile data included in the selected user view video from the encoded bitstream of the tile layer, and generating a tile bitstream corresponding to the extracted tile data; and transmitting the encoded bitstream of the base layer and the generated tile bitstream to the 360 degree video rendering apparatus, and in the selecting, a pixel warped to the user view video from the multi-view video is calculated by using a rotation matrix representing a rotation to the user view video from the multi-view video and a translation matrix representing a distance.

Meanwhile, according to an embodiment of the present disclosure, various embodiments described above may be implemented by software including instructions stored in machine (e.g., a computer)-readable storage media. The machine as a device capable of calling the stored instructions from the storage media and operating according to the called instructions may include an electronic device (e.g., an electronic device A) according to disclosed embodiments. When the instruction is executed by the processor, the processor may directly perform a function corresponding to the instruction or the function corresponding to the instruction may be performed by using other components under the control of the processor. The instruction may include a code generated or executed by a compiler or an interpreter. The machine-readable storage media may be provided as a form of non-transitory storage media. Here, 'non-transitory' just means that the storage media do not include a signal and are tangible, and does not distinguish that data is permanently or temporarily stored in the storage media.

Further, according to an embodiment of the present disclosure, the method according to various embodiments described above may be provided while being included in a computer program product. The computer program products may be traded between a seller and a purchaser as merchandise. The computer program product may be distributed in the form of a device readable storage medium (e.g., compact disc read only memory (CD-ROM) or distributed (e.g., downloaded or uploaded) online through an application store (e.g., Play Store™)). In the case of online distribution, some of the computer program products may be at least transitorily stored in a device readable storage medium such as a server of a manufacturer, a server of the application store, or a memory of a relay server, or temporarily generated.

Further, according to an embodiment of the present disclosure, various embodiments described above may be implemented in a computer or a storage medium readable by a device similar thereto by using software, hardware, or a combination thereof. In some cases, the embodiments described in the present disclosure may be implemented as the processor itself. According to software implementation, embodiments such as a procedure and a function described in the present disclosure may be implemented by separate software modules. Each of the software modules may perform one or more functions and operations described in the present disclosure.

Meanwhile, computer instructions for performing a processing operation of the machine according to various embodiments described above may be stored in a non-transitory computer-readable medium. When the computer instructions stored in the non-transitory computer-readable medium are executed by a processor of a specific machine, the computer instructions allow a specific machine to perform a processing operation in the machine according to various embodiments described above. The non-transitory computer-readable medium is not a medium that stores data therein for a while, such as a register, a cache, a memory, or the like, but means a medium that semi-permanently stores data therein and is readable by a machine. As a specific example of the non-transitory computer-readable medium, there may be a CD, a DVD, a hard disk, a blue-ray disk, a USB, a memory card, a ROM, etc.

Further, each of the components (e.g., modules or programs) according to various embodiments described above may be constituted by a single or a plurality of entities, and some sub components among the corresponding sub components may be omitted or other sub components may be further include in various embodiments. Alternatively or additionally, some components (e.g. modules or programs) are integrated into one entity to perform a function performed by each corresponding component before integration in the same or similar manner. According to various embodiments, operations performed by modules, programs, or other components are executed sequentially in parallel, repeatedly, or heuristically, or at least some operations may be executed in different orders or omitted, or other operations may be added.

While the embodiments of the present disclosure have been illustrated and described above, the present disclosure is not limited to the aforementioned specific embodiments, various modifications may be made by a person with ordinary skill in the technical field to which the present disclosure pertains without departing from the subject matters of the present disclosure that are claimed in the claims, and these modifications should not be appreciated individually from the technical spirit or prospect of the present disclosure.

What is claimed is:

1. A method for streaming a 360 degree video, which is performed by a 360 degree video streaming apparatus, the method comprising:
    encoding a multi-view video to a bitstream of a base layer and a bitstream of a tile layer constituted by at least one tile;
    selecting a tile included in a user view video in the encoded bitstream of the tile layer by using user view information received from a 360 degree video rendering apparatus, and video information of the multi-view video;
    extracting tile data included in the selected user view video from the encoded bitstream of the tile layer, and generating a tile bitstream corresponding to the extracted tile data; and
    transmitting the encoded bitstream of the base layer and the generated tile bitstream to the 360 degree video rendering apparatus,
    wherein in the selecting, a pixel warped to the user view video from the multi-view video is calculated by using a rotation matrix representing a rotation to the user view video from the multi-view video and a translation matrix representing a distance.

2. The method of claim 1, wherein the user view information includes rotation and position values of a head-mounted display worn by a user.

3. The method of claim 1, wherein the video information of the multi-view video includes a depth map of the multi-view video and a camera parameter of each video.

4. The method of claim 1, wherein in the selecting, some pixels corresponding to each other are selected in the multi-view video and the user view video, respectively to calculate whether a user view tile is included.

5. The method of claim 4, wherein a coordinate of a pixel to be used for calculating whether the user view tile is included is determined as a multiple of a Heuristic interval coefficient.

6. The method of claim 1, wherein in the selecting, a tile index of a pixel coordinate in the multi-view video corresponding to the calculated warped pixel is calculated by using a width and a height of the multi-view video and a width and a height of the tile.

7. The method of claim 1, wherein in the selecting, when the calculated warped pixel is included in a point set of the user view video, the tile index of the pixel coordinate in the multi-view video corresponding to the calculated warped pixel is added to an index set of the user view tile.

8. The method of claim 7, wherein in the generating, tile data corresponding to the added index set of the user view tile is extracted from the encoded bitstream of the tile layer.

9. The method of claim 1, wherein in the generating, the tile data included in the selected user view video is analyzed in units of network abstraction layer (NAL) from the bitstream of the encoded tile layer, and a tile is included in the user view video is extracted to generate the tile bitstream.

10. An apparatus for streaming a multi-view 360 degree video, the apparatus comprising:
    a video encoder encoding a multi-view video to a bitstream of a base layer and a bitstream of a tile layer constituted by at least one tile;
    a user view tile selector selecting a tile included in a user view video in the encoded bitstream of the tile layer by using user view information received from a 360 degree video rendering apparatus, and video information of the multi-view video;
    a tile extractor extracting tile data included in the selected user view video from the encoded bitstream of the tile layer, and generating a tile bitstream corresponding to the extracted tile data; and
    a transmitter transmitting the encoded bitstream of the base layer and the generated tile bitstream to the 360 degree video rendering apparatus,
    wherein the user view tile selector calculates a pixel warped to the user view video from the multi-view video by using a rotation matrix representing a rotation to the user view video from the multi-view video and a translation matrix representing a distance.

11. The apparatus of claim 10, wherein the user view information includes rotation and position values of a head-mounted display worn by a user.

12. The apparatus of claim 10, wherein the video information of the multi-view video includes a depth map of the multi-view video and a camera parameter of each video.

13. The apparatus of claim 10, wherein the user view tile selector selects some pixels corresponding to each other in the multi-view video and the user view video, respectively to calculate whether a user view tile is included.

14. The apparatus of claim 13, wherein a coordinate of a pixel to be used for calculating whether the user view tile is included is determined as a multiple of a Heuristic interval coefficient.

15. The apparatus of claim 10, wherein the user view tile selector calculates a tile index of a pixel coordinate in the multi-view video corresponding to the calculated warped pixel by using a width and a height of the multi-view video and a width and a height of the tile.

16. The apparatus of claim 10, wherein the user view tile selector adds, when the calculated warped pixel is included in a point set of the user view video, the tile index of the pixel coordinate in the multi-view video corresponding to the calculated warped pixel to an index set of the user view tile.

17. The apparatus of claim 16, wherein the tile extractor extracts tile data corresponding to the added index set of the user view tile from the encoded bitstream of the tile layer.

18. The apparatus of claim 10, wherein the tile extractor analyzes the tile data included in the selected user view video in units of network abstraction layer (NAL) from the bitstream of the encoded tile layer, and extracts a tile is included in the user view video to generate the tile bitstream.

19. A non-transitory computer readable storage medium for storing instructions, wherein when the instructions are executed by a processor, the instructions allow the processor to execute a method, the method comprising:
  encoding a multi-view video to a bitstream of a base layer and a bitstream of a tile layer constituted by at least one tile;
  selecting a tile included in a user view video in the encoded bitstream of the tile layer by using user view information received from a 360 degree video rendering apparatus, and video information of the multi-view video;
  extracting tile data included in the selected user view video from the encoded bitstream of the tile layer, and generating a tile bitstream corresponding to the extracted tile data; and
  transmitting the encoded bitstream of the base layer and the generated tile bitstream to the 360 degree video rendering apparatus, and
  wherein in the selecting, a pixel warped to the user view video from the multi-view video is calculated by using a rotation matrix representing a rotation to the user view video from the multi-view video and a translation matrix representing a distance.

* * * * *